(12) United States Patent
Ardö et al.

(10) Patent No.: US 10,972,659 B2
(45) Date of Patent: Apr. 6, 2021

(54) IMAGE CAPTURING DEVICE, A METHOD AND A COMPUTER PROGRAM PRODUCT FOR FORMING AN ENCODED IMAGE

(71) Applicant: Axis AB, Lund (SE)

(72) Inventors: Björn Ardö, Lund (SE); Stefan Lundberg, Lund (SE); Stefan Sandström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/546,926

(22) Filed: Aug. 21, 2019

(65) Prior Publication Data

US 2020/0068124 A1 Feb. 27, 2020

(30) Foreign Application Priority Data

Aug. 27, 2018 (EP) .................................... 18190932

(51) Int. Cl.
*H04N 5/232* (2006.01)
*H04N 5/225* (2006.01)
*H04N 19/46* (2014.01)
*H04N 5/04* (2006.01)
*H04N 19/136* (2014.01)
*H04N 5/262* (2006.01)
(Continued)

(52) U.S. Cl.
CPC .......... *H04N 5/23229* (2013.01); *H04N 5/04* (2013.01); *H04N 5/2258* (2013.01); *H04N 5/2624* (2013.01); *H04N 19/136* (2014.11); *H04N 19/174* (2014.11); *H04N 19/46* (2014.11); *H04N 5/23238* (2013.01)

(58) Field of Classification Search
CPC ............. H04N 5/23229; H04N 19/174; H04N 5/2624; H04N 19/136; H04N 5/04; H04N 19/46; H04N 5/2258; H04N 5/23238; H04N 19/115; H04N 5/247; H04N 19/172; H04N 19/14; H04N 19/184; H04N 19/176; H04N 21/23602; H04N 21/23608; H04N 5/265; H04N 7/181; H04N 5/23206; H04N 5/235; H04N 19/436
USPC .................................................. 348/143–159
See application file for complete search history.

(56) References Cited

U.S. PATENT DOCUMENTS 10,715,843 B2 * 7/2020 Van Brandenburg ........................ H04N 21/2353
2004/0179591 A1 * 9/2004 Wenger ............ H04N 21/23655 375/240.01

(Continued)

FOREIGN PATENT DOCUMENTS

WO 2017/127816 A1 7/2017
WO 2018/045098 A1 3/2018

OTHER PUBLICATIONS

Partial European Search Report dated Jan. 31, 2019 for the European Patent Application No. 18190932.6.

(Continued)

*Primary Examiner* — Albert H Cutler
(74) *Attorney, Agent, or Firm* — Volpe Koenig (57) ABSTRACT

A method, device, and computer program product related to the field of image encoding. In particular, the method, device, and computer program product uses multiple image sensors and multiple encoders for outputting a single encoded image, where image data captured by a first image sensor is added to the encoded image as a first tile or slice, and where image data captured by a second image sensor is added to the encoded image as a second tile or slice.

14 Claims, 4 Drawing Sheets

(51) Int. Cl.
*H04N 19/174* (2014.01)
*H04N 5/247* (2006.01)
*H04N 19/14* (2014.01)
*H04N 19/115* (2014.01)
*H04N 19/184* (2014.01)
*H04N 19/176* (2014.01)
*H04N 21/236* (2011.01)
*H04N 5/265* (2006.01)
*H04N 7/18* (2006.01)
*H04N 5/235* (2006.01)
*H04N 19/436* (2014.01)

(56) References Cited

U.S. PATENT DOCUMENTS

| | | | |
|---|---|---|---|
| 2005/0175091 A1 | 8/2005 | Puri et al. | |
| 2008/0049116 A1* | 2/2008 | Tojima | H04N 5/232 348/222.1 |
| 2010/0033632 A1* | 2/2010 | Tsukagoshi | H04N 21/235 348/588 |
| 2011/0063409 A1* | 3/2011 | Hannuksela | H04N 19/46 348/42 |
| 2013/0101216 A1* | 4/2013 | Cho | H04N 19/174 382/173 |
| 2013/0141523 A1* | 6/2013 | Banta | H04N 21/47202 348/36 |
| 2013/0266065 A1* | 10/2013 | Paczkowski | H04N 19/597 375/240.12 |
| 2014/0029860 A1* | 1/2014 | Rundo | H04N 19/597 382/233 |
| 2014/0133568 A1* | 5/2014 | Otsuka | H04N 19/436 375/240.16 |
| 2015/0116451 A1* | 4/2015 | Xu | H04N 5/23238 348/14.13 |
| 2015/0288865 A1 | 10/2015 | Osborne | |
| 2016/0088280 A1 | 3/2016 | Sadi et al. | |
| 2016/0286138 A1 | 9/2016 | Kim | |
| 2017/0345129 A1* | 11/2017 | Doshi | H04N 9/045 |
| 2017/0366812 A1* | 12/2017 | Abbas | H04N 5/23238 |
| 2018/0020238 A1 | 1/2018 | Liu et al. | |
| 2018/0041764 A1* | 2/2018 | Lin | G06T 11/60 |
| 2018/0084257 A1 | 3/2018 | Abbas | |
| 2018/0367586 A1* | 12/2018 | Maze | H04L 65/608 |
| 2019/0052815 A1* | 2/2019 | Wang | H04N 5/247 |
| 2019/0098276 A1* | 3/2019 | Duggan | H04N 13/296 |
| 2019/0158859 A1* | 5/2019 | Zhang | H04N 19/436 |

OTHER PUBLICATIONS

Extended European Search Report dated Mar. 11, 2019 for the European Patent Application No. 18190932.6.

\* cited by examiner

IMAGE CAPTURING DEVICE, A METHOD AND A COMPUTER PROGRAM PRODUCT FOR FORMING AN ENCODED IMAGE

FIELD OF INVENTION

The present teachings relate to the field of image encoding. In particular, the present teachings relate to a method and device employing multiple image sensors and multiple encoders for outputting a single encoded image.

BACKGROUND

In recent years the numbers of monitoring cameras, for example, network camera monitoring systems, have increased. Many monitoring systems use a plurality of image sensors for capturing images of a scene, to cover a larger area of a scene and/or to capture more details of the scene. Typically, such a monitoring system produces a plurality of image streams which are transferred to, for example, a display of an operator or to a video analytics unit, for further analytics or editing to be performed on the footage of the scene. However, this solution may cause a reduced quality or increased complexity of automatic analytics made on image data for certain parts of the scene (e.g., on parts corresponding to edges of field of view of an image sensor). Another disadvantage may be that synchronization between the different image streams is required when editing or stepping through frames in the image streams.

There is thus a need for improvements within this context.

SUMMARY

In view of the above, it is thus an object of the present teachings to overcome or at least mitigate the problems discussed above. In particular, it is an object to provide a device and method which take advantage of the concept of tiles/slices in, for example, H.265 encoding to produce a single encoded image from a plurality of image data captured by a plurality of image sensors.

According to a first aspect of the present teachings, there is provided an image capturing device comprising: a first and a second image sensor; a first and a second encoder; and a stream multiplexer; wherein the first encoder is arranged to encode first image data captured by the first image sensor, and the second encoder is arranged to encode second image data captured by the second image sensor; wherein the stream multiplexer is arranged to receive data encoded by the first encoder and data encoded by the second encoder, and to form an encoded image, the encoded image comprising the encoded first data as a first tile or a first slice and the encoded second data as a second tile or a second slice.

Tiles and slices allow for the picture to be divided into a grid of rectangular regions that can independently be decoded/encoded. The inventors have realized that this concept may advantageously be employed by a device according to the present teachings described herein, which has at least two image sensor, each connected to a separate encoder which encodes images from the respective image sensor, and thus provides first encoded data and second encoded data. The first and second encoded data are received by a stream multiplexer, in other words, a unit adapted to form a single encoded image from at least two separately encoded data, wherein the encoded image comprising the encoded first data as a first tile or a first slice and the encoded second data as a second tile or a second slice.

Several advantages may be achieved from the above embodiment. Analytics may be simplified since only a single bit stream (e.g., a single image/frame per time interval based on the frame rate of the image sensors) needs to be analyzed, removing problems associated with synchronizing the content of the separate streams to, for example, follow objects moving in the scene and being captured by different image sensors during their path, or to analyze content of the scene positioned in a transition between parts of the scene captured by the first image sensor and parts of the scene captured by the second image sensor. Moreover, a single encoded image simplifies editing (e.g., cropping, rotation, and the like) of the image data captured by the plurality of image sensors, compared to perform the same editing using a plurality of images which needs to be separately edited and put together. Moreover, synchronized stepping through video captured by the plurality of image sensors is simplified, since the image data from the respective image sensors are joined to a single bit stream. This is advantageous, even though the scene captured by the plurality of image sensors is not continuous, in other words, when the field of view of the first image sensor is not adjacent to the field of view of the second image sensor.

According to some embodiments, each of the first and second encoded data includes metadata indicating a moment in time when the first and second sensors captured the first and second image data, wherein the stream multiplexer is adapted to form the encoded image only if the respective metadata of the first and second encoded data indicates that the moments in time for capturing the first and second image data are equal. Advantageously, in case one of the two image sensors for some reason fails to capture an image, the stream multiplexer may throw away the encoded image data from the other image sensor, to uphold the synchronization of image data from the two image sensors in the encoded images formed by the stream multiplexer.

In this disclosure, the term "metadata indicating a moment in time" generally refers to any type of data, such as a time stamp, running number, etc. that the stream multiplexer can use for synchronization/comparison in time between encoded image data from the first and second encoder, respectively.

According to some embodiments, the image capturing device further comprises one or more first controllers arranged to synchronize a moment in time when the first and second image data are captured. In some embodiments, the image capturing device comprises one controller in communication with the first and second sensors. In other embodiments, the image capturing device comprises two controllers, each being in communication with a respective image sensor and also with each other. Advantageously, synchronization in time for capturing images by the two image sensors may be achieved.

According to some embodiments, the one or more first controllers are arranged to synchronize at least one from the list of: a focus setting of the first and second image sensor, an IR-cut filter setting of the first and second image sensor, and an exposure setting of the first and second image sensor. Consequently, the image data from the first and second image sensors may be more equally captured (i.e., using similar settings in the first and second image sensor), which further may improve automatic and/or manual analytics made on the encoded image, as well as visual appearance of the encoded image when decoded.

According to some embodiments, the image capturing device further comprises one or more second controllers arranged to synchronize at least one from the list of: a white balance setting of the first and second encoder, and a tone mapping setting of the first and second encoder. In some embodiments, the image capturing device comprises one second controller in communication with the first and second encoders. In other embodiments, the image capturing device comprises two such controllers, each being in communication with a respective encoder and also with each other. Advantageously, the image data from the first and second image sensors may be more equally encoded (i.e., using similar settings in the first and second image encoder), which further may improve automatic and/or manual analytics made on the encoded image as well as visual appearance of the encoded image when decoded.

According to some embodiments, the image capturing device further comprises an analyzer unit arranged to analyze a content of the first and second image data, and to determine a bitrate budget for encoding the respective image data, wherein the first and second encoder are arranged to encode the first and second image data according to the determined bitrate budget. According to other embodiments, the analyzer unit is arranged to analyze content of image data previously captured by the first and second image sensor to determine the bitrate budget for encoding the first and second image data. Advantageously, one of the first/second image data, that is, the one comprising more details and/or more important content may be encoded using a higher bitrate budget compared to the other, to further improve automatic or manual analytics made on the encoded image. Since the slices/tiles in, for example, HEVC/AVC encoding can be separately encoded as described above, such division of bitrate between the first and second encoder can be achieved.

According to some embodiments, the analyzer unit is implemented in a same chip as the first encoder. Advantageously, this facilitates a simplified manufacturing process of the image capturing device. Implementing the analyzer unit it on the same chip as the first encoder may make access to data easier.

According to some embodiments, the image capturing device further comprises a third image sensor, wherein the first encoder or the second encoder is arranged to encode third image data captured by the third image sensor; wherein the encoded image further comprises the encoded third data as a third tile or a third slice. Accordingly, at least one of the encoders are connected to two image sensors. This embodiment facilitates capturing an increased area of the scene and/or more details in the scene.

According to some embodiments, the image capturing device further comprises a third and a fourth image sensor, wherein the first encoder or the second encoder is arranged to encode third image data captured by the third image sensor, wherein the first encoder or the second encoder is arranged to encode fourth image data captured by the fourth image sensor, wherein the encoded image further comprises the encoded third data as a third tile or a third slice and the encoded fourth data as a fourth tile or a fourth slice. Accordingly, at least one of the encoders are connected to a plurality of image sensors. In this embodiment, the encoded image may have the form of a quad view, wherein each of the encoded image data forms a respective view in the quad view. A quad view is a common view used in monitoring applications, and using the present teachings described herein, synchronized stepping through image frames of the quad view is simplified. In other embodiments, the encoded first, second, third and fourth data are positioned in a sequence next to each other in a horizontal or a vertical direction in the encoded image. Advantageously, this allows for the encoded image to represent a continuously captured scene similar to how it would look like if a single image sensor was capturing the entire scene. Using several smaller image sensors may be cost efficient compared to use a single larger image sensor for achieving the same quality of the captured image. It is also a convenient way of achieving a panoramic image.

According to some embodiments, the stream multiplexer further is arranged to output the encoded image as a bitstream.

According to some embodiments, the stream multiplexer is implemented in the first encoder. Consequently, the first encoder acts as a master encoder, receiving data encoded by the other encoder(s) (e.g., in the form of encoded slices or tiles), and stitching the received encoded data together with the encoded first image data to form the encoded image. Advantageously, this may allow for an implementation of the first encoder (master encoder) on a first type of hardware (e.g., a chip of a first type) or implemented using a first type of software, while the remaining encoder(s) (slave encoder(s)) can be implemented on a second type of hardware (e.g., a chip of a second type) or implemented using a same second software. Advantageously, this may facilitate a simplified manufacturing process of the image capturing device. In another embodiment, two identical chips/software are used, wherein the stream multiplexer is disabled on the slave chip. Advantageously, fewer different components makes production less expensive.

According to a second aspect of the present teachings, the above object is achieved by a method for forming an encoded image, comprising: capturing, by a first image sensor, first image data; capturing, by a second image sensor, second image data; encoding, by a first encoder, the first image data; encoding, by a second encoder, the second image data; receiving, by a stream multiplexer, the encoded first image data; receiving, by the stream multiplexer, the encoded second image data; forming, by the stream multiplexer, the encoded image, the encoded image comprising the encoded first data as a first tile or a first slice and the encoded second data as a second tile or a second slice.

According to a third aspect of the present teachings, the above object is achieved by a computer program product comprising a non-transitory computer-readable medium with computer code instructions adapted to carry out the method of the second aspect when executed by a device having processing capability.

The second and third aspects may generally have the same features and advantages as the first aspect. It is further noted that the present teachings relates to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of embodiments of the present teachings, with reference to the appended drawings, where the same reference numerals will be used for similar elements, wherein.

DETAILED DESCRIPTION

The present teachings will now be described more fully hereinafter with reference to the accompanying drawings, in which embodiments of the present teachings are shown. The systems and devices disclosed herein will be described during operation.

In newer encoding methods, for example, Advanced Video Coding (AVC) (also called H.264) and High Efficiency Video Coding (HEVC) (also called H.265), the concept of tiles (only supported by HEVC encoding) and slices has been introduced. Tiles and slices allow for the image to be divided into a grid of rectangular regions that can be independently decoded/encoded. To be independently codable, there shall not be any predictions using pixels from more than one slice or tile, and the results from the prediction shall only be used in the same slice or tile. This concept may be used for parallel processing purposes. This concept may also be used as described herein for achieving a single encoded image in an image capturing device comprising a plurality of image sensors and a plurality of encoders, in other words, stitching image data encoded by a plurality of encoders into one encoded image.

Figure 1:
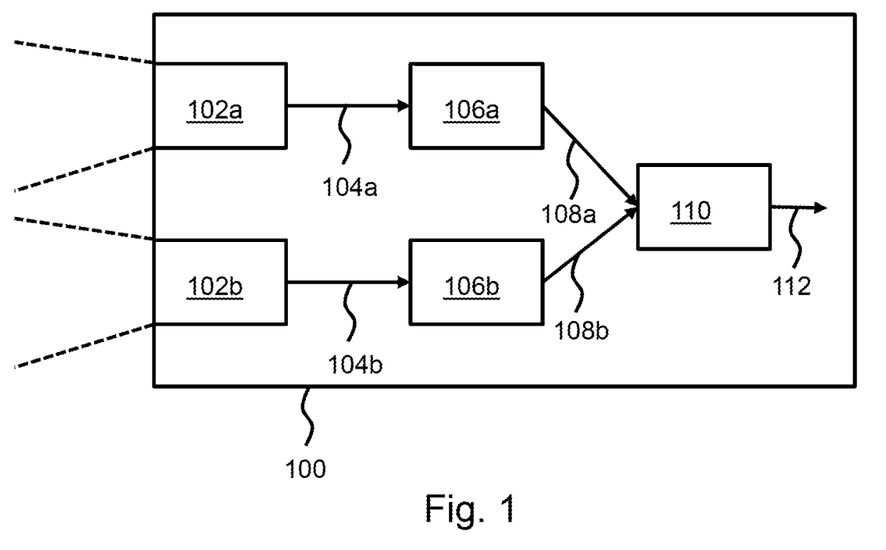
FIG. 1 shows an image capturing device according to a first embodiment.

FIG. 1 shows an image capturing device 100 implementing this concept according to a first embodiment. The image capturing device 100 comprises two image sensors 102a-b. Each image sensor 102a-b captures image data of a scene, advantageously each image sensor 102a-b captures at least partially different parts of the scene, as indicated in FIG. 1. For example, the image sensors 102a-b may capture the scene in a same direction from the image capturing device 100. It should be noted that any kind of image sensors may be used for the purposes described herein, for example an image sensor employing visual light or infrared (IR) light, a thermal sensor, a Time of Flight (ToF) sensor, etc. The image sensors 102 of the image capturing device may be adapted for continuously capturing image data of the scene (e.g., digital video camera) or be adapted to capture single moments in time of the scene (e.g., a digital still camera).

In the embodiment of FIG. 1, a first image sensor 102a is connected to a first encoder 106a, and a second image sensor 102b is connected to a second encoder 106b. The first encoder 106a is arranged to encode first image data 104a captured by the first image sensor 102a and received by the first encoder 106a. The second encoder 106b is arranged to encode second image data 104b captured by the second image sensor 102b and received by the second encoder 106b. The image capturing device 100 further comprises a stream multiplexer 110 which is arranged to receive data 108a encoded by the first encoder 106a and data 108b encoded by the second encoder 106b. The stream multiplexer 110 is further arranged to form an encoded image 112, the encoded image comprising the encoded first data 108a as a first tile or a first slice and the encoded second data 108b as a second tile or a second slice. In other words, the stream multiplexer 110 is arranged to aggregate (or concatenate, and the like) a bit stream 108a received from the first encoder 106a which comprises the first image data 104a encoded as a slice or a tile, and a bit stream 108b received from the second encoder 106b which comprises the second image data 104b encoded as a slice or a tile, into a single bit stream 112 comprising the encoded image.

According to some embodiments, the first and second encoded data 108a-b includes metadata indicating a moment in time when the first and second sensors captured the first and second image data. This metadata may for example be included in a header of the bit streams 108a-b. This allows the stream multiplexer 110 to quickly detect if the bit streams (encoded image data) 108a-b received from the first and second encoders 104a-b respectively represent image data captured by the image sensors 102a-b at a same point in time or not. In some embodiments, the stream multiplexer 110 is adapted to form the encoded image 112 only if the respective metadata of the first and second encoded data 108a-b indicate that the moments in time for capturing the first and second image data 104a-b are equal. In other embodiments, the stream multiplexer may be arranged to still form the encoded image 112, where the part (slice or tile) of the encoded image which has not been received is represented by, for example, a black area in the encoded image. Synchronizing the encoded image data will generally not be particularly efficient. Instead, it is advisable to do the synchronization before encoding, such that if the first or the second image is missing, the other is discarded in order not to jumble the slices in a group of pictures. If a black area is inserted in lieu of a missing first or second image, the same problem can be solved by communicating back to the encoder that the reference frame for the next image is to be black.

Figure 2:
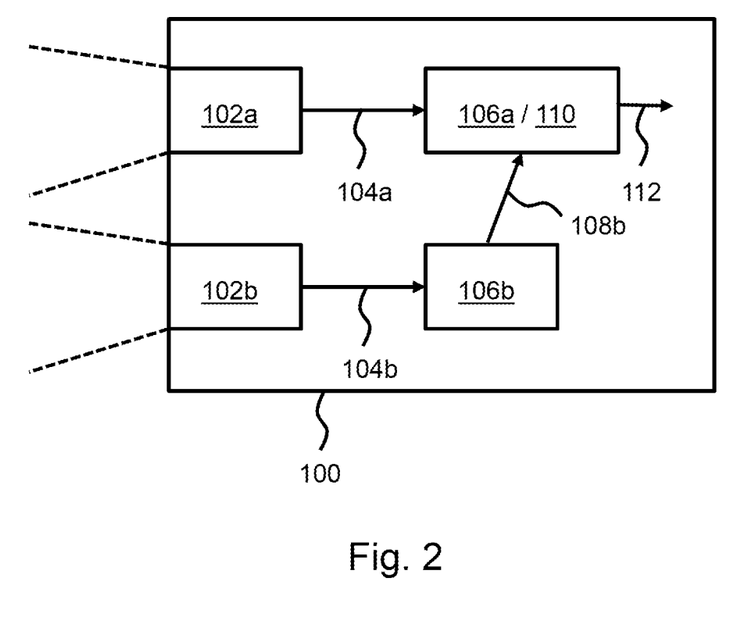
FIG. 2 shows an image capturing device according to a second embodiment.

According to some embodiments, the stream multiplexer 110 is implemented in the first encoder 106a. In this embodiment, the first encoder 106a may be called master encoder, and the second encoder 106b may be called slave encoder. This embodiment is shown in FIG. 2. In the embodiment of FIG. 2, the first encoder 106a (also acting as the stream multiplexer 110 in FIG. 1) is arranged to receive data 108 b encoded by the second encoder 106b. The first encoder 106a is further arranged to form the encoded image 112, the encoded image 112 comprising the encoded first data (not shown in FIG. 2) as a first tile or a first slice and the encoded second data 108b as a second tile or a second slice.

Figure 3:
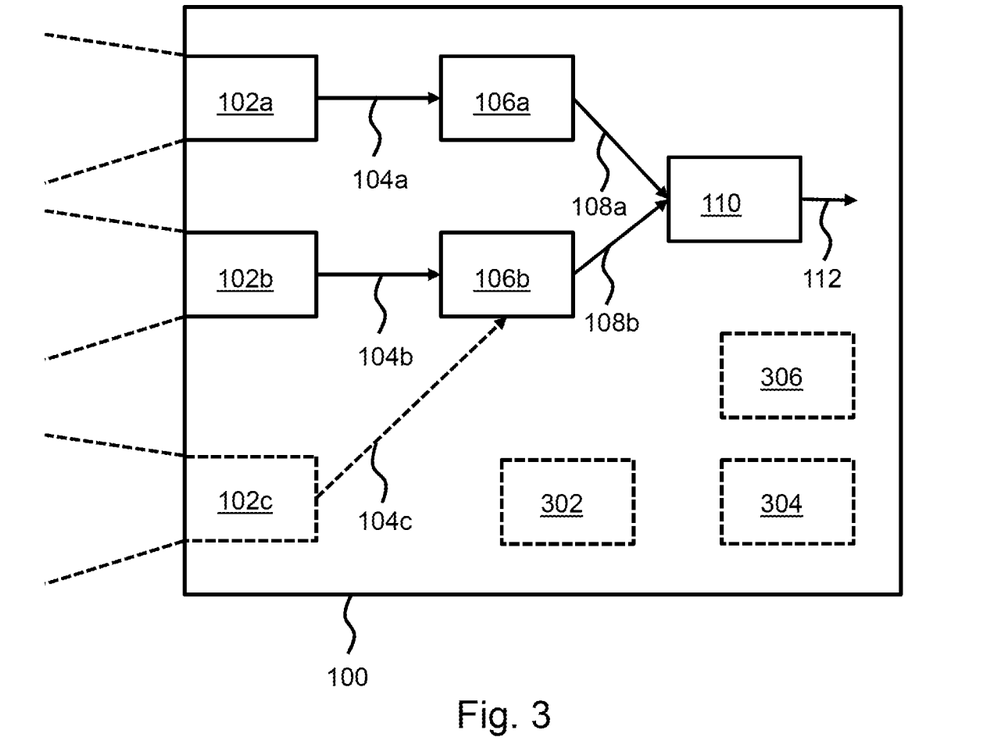
FIG. 3 shows an image capturing device according to a third embodiment.

In the embodiments of FIGS. 1-2, the image capturing device 100 comprises two image sensors 102a-b. However, it should be noted that any number of image sensors and encoders may be employed. For example, the image capturing device 100 may comprise a third image sensor 102c which may send captured image data to a third encoder, or to one of the first and second encoders 106 a-b. In other words, at least one of the encoders 106 of the image capturing device 100 may be connected to a plurality of image sensors. FIG. 3 shows one such embodiment, where the second encoder 106b is arranged to encode third image data 104c captured by a third image sensor 102c into a third slice or tile which is sent over to the stream multiplexer 110. It should be noted that according to some embodiments, the image data 104b-c from the second and third image sensors 102b-c may be concatenated before encoding by the second encoder 106b. Consequently, the image data 104b-c from the second and third image sensors 102b-c may in some embodiments be encoded into a single slice or tile.

Optionally, the image capturing device 100 may comprise one or more first controllers 302 in communication with the image sensors 102 and adapted to synchronize image capturing settings between the image sensors 102. For example, the one or more first controllers 302 may be arranged to synchronize a moment in time when the first and second (and third, and the like) image data 104 is captured. In some embodiments, the image capturing device 100 comprises a single first controller 302 in communication with all image sensors 102 of the image capturing device 100 to synchronize the moment in time the respective image sensors 102 are capturing image data 104. In other embodiments (not shown in FIG. 3), the image capturing device comprises a separate first controller 302 for each image sensor 102, where each of the plurality of first controllers 302 is in communication with a respective sensor 102a-c and with each other to synchronize the image sensors 102.

Alternatively, or additionally, the one or more first controllers 302 are arranged to synchronize at least one from the list of: a focus setting of image sensors 102, an IR-cut filter setting of the image sensors 102, and an exposure setting of the image sensors 102.

Optionally, the image capturing device may further comprise one or more second controllers 304 in communication with the first and second encoders 106a-b and adapted to synchronize encoding settings between the encoders 106a-b. In some embodiments, the image capturing device 100 comprises a single second controller 304 in communication with all encoders 106 of the image capturing device 100 to synchronize settings between the encoders 106. In other embodiments (not shown in FIG. 3), the image capturing device comprises a separate second controller 304 for each image sensor 102, where each of the plurality of second controllers 304 is in communication with a respective image sensor 102a-b and with each other to synchronize image processing parameters. For example, the one or more second controllers 304 may be arranged to synchronize at least one from the list of: a white balance setting of an image processor (not shown) for each image sensor 102, and a tone mapping setting of the image processor. Tone mapping means that some brightness levels in the captured image data are dropped, to decrease the bit depth (e.g., if the image sensor is a wide dynamic range image sensor). Both the darkest and the brightest parts are taken into account, resulting in more details at both ends of the scale. There are two types of tone mapping. In global tone mapping, all pixels are handled the same way, meaning that the same levels are removed everywhere in the image. With local tone mapping, decisions are made locally in the image/image data, to determine which levels to remove.

Optionally, the image capturing device may further comprise an analyzer unit 306 arranged to analyze a content of the first and second (and third) image data 104, and to determine a bitrate budget for encoding the respective image data 104a-c. This bitrate budget is communicated to the encoders 106, which are arranged to encode the received image data 104 according to the determined bitrate budget. Embodiments of such analysis are described in EP 3021583 A1 (Axis AB, SE).

According to some embodiments, the analyzer unit 306 is arranged to determine/control the bitrate budget based on historical data, for example looking at short term and long term output bitrate from the image capturing device 100, to determine the bitrate budget for the respective encoders. Examples of such bitrate control methods may be found in applicant's EP applications 17167724.8 and 17167732.1. In some embodiments, the analyzer unit 306 is implemented in a same chip as the first encoder 106a.

Figure 4:
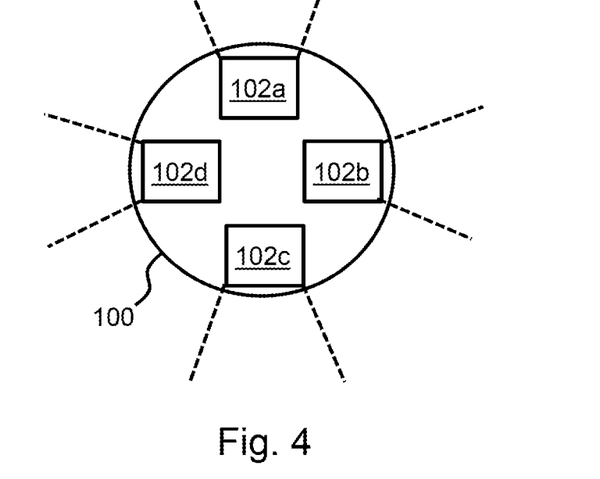
FIG. 4 shows an image capturing device according to a fourth embodiment.

In the embodiments of FIGS. 1-3, the image sensors 102 have been depicted as capturing image data of a scene in a same direction from the image capturing device. However, this design is merely by way of example, and other designs of the image capturing device 100 are equally possible. One alternative design is shown in FIG. 4, showing an image capturing device 100 from above. The image capturing device 100 in this embodiment has a circular (spherical or disc shaped) design, where four image sensors 102a-d are positioned to each capture ~90 degrees of a surrounding scene. Such an image capturing device may thus provide a 360-degrees panoramic view of the area/scene around the image capturing device 100. Consequently, the image capturing device 100 may comprise a third 102c and a fourth 102d image sensor. In this embodiment, the first encoder or the second encoder (not shown in FIG. 4) may arranged to encode third image data captured by the third image sensor 102c. Furthermore, the first encoder or the second encoder (not shown in FIG. 4) may be arranged to encode fourth image data captured by the fourth image sensor 102d. In this embodiment, similar to what has been described in conjunction with FIGS. 1-3 above, the encoded image further comprises the encoded third data as a third tile or a third slice and the encoded fourth data as a fourth tile or a fourth slice. Obviously, an image capturing device as shown in FIGS. 1-3 may also comprise a fourth image sensor (and fifth, sixth, and the like depending on the application). Moreover, any other suitable positioning of image sensors is equally applicable within the scope of the present disclosure.

Figure 5:
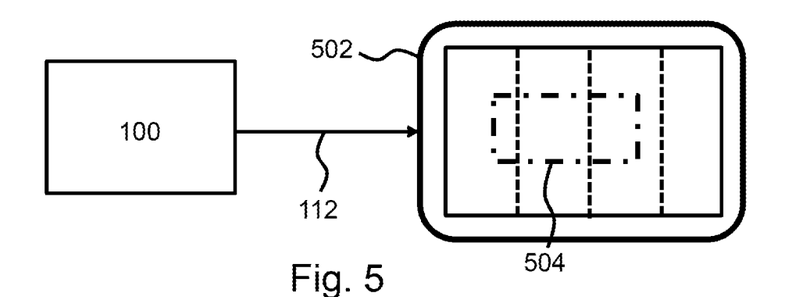
FIG. 5 shows the display of an encoded image according to one embodiment.
Figure 6:
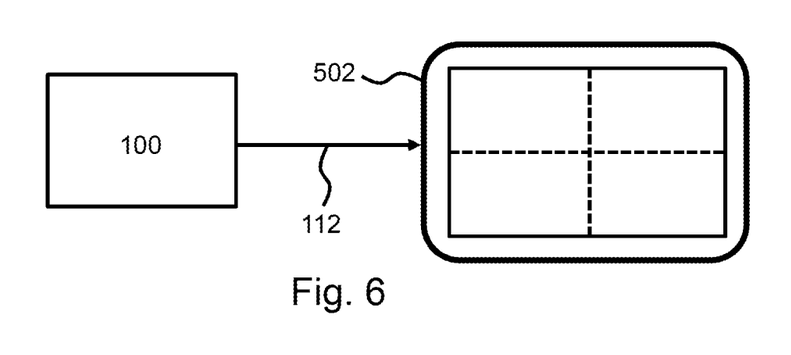
FIG. 6 shows the display of an encoded image according to another embodiment.

FIGS. 5-6 show different forms of the encoded image which comprise four tiles or slices, each originating from a different image sensor 102. In FIG. 5, the encoded first, second, third and fourth data 104 are positioned in a sequence next to each other in a horizontal direction in the encoded image 112, denoted by the dashed lines. In other embodiments (not shown) the encoded first, second, third and fourth data 104 are positioned in a sequence next to each other in a vertical direction in the encoded image 112. When being decoded (e.g., when shown on a display 502), the decoded version of the encoded image 112 thus may show a continuously captured scene similar to how it would look like if a single image sensor was capturing the entire scene. Encoding the image in this way allows for cropping/zooming of the decoded image in a natural-looking way, such as shown in FIG. 5 (the dashed-dotted rectangle 504 in the display 502). Moreover, in case the decoded image represents a 360-degrees panoramic view of the captured scene, a "rotation" of the scene as displayed may be achieved by, on the encoder side, changing the order of the tiles/slices in the encoded image 112.

In the embodiment of FIG. 6, the encoded image 112 has the form of a quad view, wherein each of the encoded image data forms a respective view in the quad view.

It may be noted that the embodiments shown in FIGS. 5 and 6 are possible with tiling, as available, for example, in H.265, but not with slicing in H.264. However, the skilled person will appreciate that similar embodiments using slices are also possible, for example, with horizontal slices instead of the vertical tiles in FIG. 5.

Figure 7:
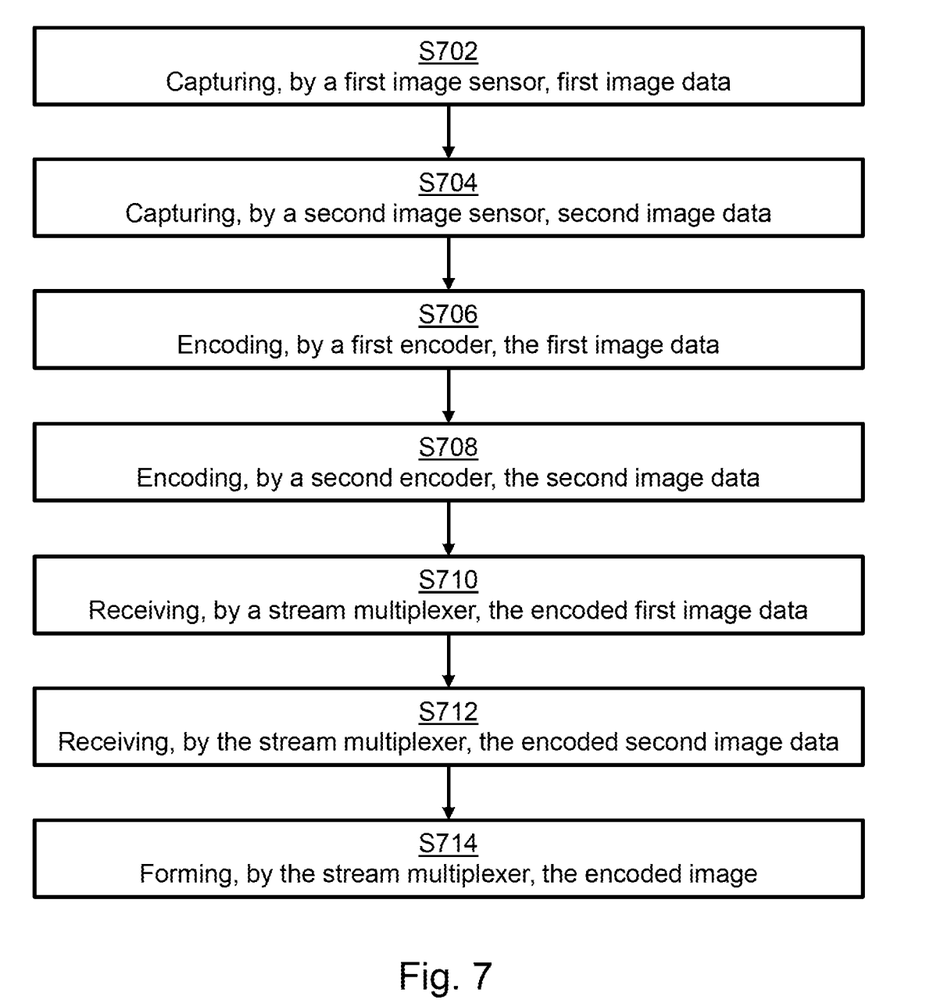
FIG. 7 shows a method for forming an encoded image according to an embodiment.

FIG. 7 shows by way of example a method for forming an encoded image as described above, the method comprising: capturing S702, by a first image sensor, first image data; capturing S704, by a second image sensor, second image data; encoding S706, by a first encoder, the first image data; encoding S708, by a second encoder, the second image data; receiving S710, by a stream multiplexer, the encoded first image data; receiving S712, by the stream multiplexer, the encoded second image data; and forming S714, by the stream multiplexer, the encoded image, the encoded image comprising the encoded first data as a first tile or a first slice and the encoded second data as a second tile or a second slice.

It should be noted that although FIG. 7 shows the method as a sequence of successive steps, the steps need not be performed strictly in the shown order, and two or more steps may be performed simultaneously. For instance, the first and second image may be captured simultaneously, and they may be encoded simultaneously, and the first and second image data may be forwarded to the stream multiplexer simultaneously or in any desired order.

The present teachings disclosed herein can be used both for video encoding, where the first and a second image sensor (and third, fourth, and the like) continuously captures image data, and image encoding. It should be noted that an I-frame in an encoded video stream is basically a still image, and consequently, the disclosure herein is advantageously used also for image encoding.

The devices and methods disclosed hereinabove may be implemented as software, firmware, hardware or a combination thereof. In a hardware implementation, the division of tasks between functional units (e.g., first and second image sensor, first and second encoder, first controllers, second controllers, analyzer unit, stream multiplexer, and the like) referred to in the above description does not necessarily correspond to the division into physical units; to the contrary, one physical component may have multiple functionalities, and one task may be carried out by several physical components in cooperation. Certain components or all components (e.g., first and second image sensor, first and second encoder, first controllers, second controllers, analyzer unit, stream multiplexer etc.) may be implemented as software executed by a digital signal processor or microprocessor, or be implemented as hardware or as an application-specific integrated circuit. Such software (computer program product) may be distributed on computer readable media, which may comprise computer storage medium (or non-transitory media) and communication medium (or transitory media). As is well known to a person skilled in the art, the term computer storage medium includes both volatile and non-volatile, removable and non-removable media implemented in any method or technology for storage of information such as computer readable instructions, data structures, program modules or other data.

Additionally, variations to the disclosed embodiments can be understood and effected by the skilled person in practicing the present teachings from a study of the drawings, the disclosure, and the appended claims. For example, an image sensor described herein may be connected to a plurality of encoders, where each encoder receives a separate part of the image data captured by the image sensor. Such embodiments could also be combined with the methods described in EP2814253 B1 (Axis AB, SE).

Moreover, in the drawings and specification, there have been disclosed embodiments and examples of the present teachings and, although specific terms are employed, they are used in a generic and descriptive sense only and not for the purpose of limitation, the scope of the present teachings being set forth in the following claims. In the claims, the word "comprising" does not exclude other elements or steps, and the indefinite article "a" or "an" does not exclude a plurality.

What is claimed is:

1. An image capturing device comprising
a first and a second image sensor;
a first and a second encoder;
an image data combining unit, wherein the image data combining unit is implemented in the first encoder;
wherein the first image sensor is configured to capture a first image frame,
wherein the second image sensor is configured to capture a second image frame;
wherein the first encoder is configured to encode image data of the first image frame into first encoded data, and the second encoder is configured to encode image data of the second image frame into second encoded data;
wherein the image data combining unit is configured to receive the first encoded data from the first encoder and the second encoded data encoded from the second encoder, and to form an encoded image, the encoded image comprising the first encoded data as a first tile or a first slice and the second encoded data as a second tile or a second slice.

2. The image capturing device according to claim 1, wherein each of the first and second encoded data includes metadata indicating a moment in time when the first and second sensors captured the first and second image frames, wherein the image data combining unit is adapted to form the encoded image only if the respective metadata of the first and second encoded data indicates that the moments in time for capturing the first and second image data are equal.

3. The image capturing device according to claim 1, further comprising one or more first controllers configured to synchronize a moment in time when the first and second image data is captured.

4. The image capturing device according to claim 1, further comprising one or more first controllers configured to synchronize at least one from the list of: a focus setting of the first and second image sensor, an IR-cut filter setting of the first and second image sensor, and an exposure setting of the first and second image sensor.

5. The image capturing device according to claim 1, further comprising one or more second controllers configured to synchronize at least one from the list of: a white balance setting of the first and second encoder, and a tone mapping setting of the first and second encoder.

6. The image capturing device according to claim 1, further comprising:
a processor configured to analyze a content of the first and second image data, and to determine a bitrate budget for encoding the respective image data, wherein the first and second encoder are configured to encode the first and second image data according to the determined bitrate budget.

7. The image capturing device according to claim 6, wherein the processor is implemented in a same chip as the first encoder.

8. The image capturing device according to claim 1, further comprising:
a third image sensor; wherein the third image sensor is configured to capture a third image frame;
wherein the first encoder or the second encoder is configured to encode image data of the third frame into third encoded data;
wherein the image data combining unit is configured to receive the third encoded data from the first or second encoder being arranged to encode the image data of the third frame into third encoded data, wherein the encoded image further comprises the third encoded data as a third tile or a third slice.

9. The image capturing device according to claim 1, further comprising:

a third and a fourth image sensor; wherein the third image sensor is configured to capture a third image frame and wherein the fourth image sensor is configured to capture a fourth image frame;

wherein the first encoder or the second encoder is configured to encode image data of the third frame into third encoded data;

wherein the first encoder or the second encoder is configured to encode image data of the fourth frame into fourth encoded data;

wherein the image data combining unit is configured to receive the third encoded data from the first or second encoder being configured to encode the image data of the third frame into third encoded data, and the fourth encoded data from the first or second encoder being configured to encode the image data of the fourth frame into fourth encoded data, wherein the encoded image further comprises the third encoded data as a third tile or a third slice and the encoded fourth data as a fourth tile or a fourth slice.

10. The image capturing device according to claim 9, wherein the encoded image has the form of a quad view, wherein each of the encoded image data forms a respective view in the quad view.

11. The image capturing device according to claim 9, wherein the encoded first, second, third and fourth data are positioned in a sequence next to each other in a horizontal or a vertical direction in the encoded image.

12. The image capturing device according to claim 1, wherein the image data combining unit further is configured to output the encoded image as a bit stream.

13. A method for forming an encoded image, the method performed by an image capturing device, the method comprising:

capturing, by a first image sensor, a first image frame;

capturing, by a second image sensor, a second image frame;

encoding, by a first encoder, image data of the first image frame into first encoded data;

encoding, by the second encoder, image data of the second image frame into second encoded data;

receiving, by an image data combining unit, the first encoded data, wherein the image data combining unit is implemented in the first encoder;

receiving, by the image data combining unit, the second encoded data; and forming, by the image data combining unit, the encoded image, the encoded image comprising the first encoded data as a first tile or a first slice and the second encoded data as a second tile or a second slice.

14. A non-transitory computer-readable storage medium including instructions which, when executed by a device having a processing capability, cause the device to execute instructions for forming an encoded image, the instructions causing the device to perform operations comprising:

capturing, by a first image sensor, a first image frame;

capturing, by a second image sensor, a second image frame;

encoding, by a first encoder, image data of the first image frame into first encoded data;

encoding, by a second encoder, image data of the second image frame into second encoded data;

receiving, by an image data combining unit, the first encoded data, wherein the image data combining unit is implemented in the first encoder;

receiving, by the image data combining unit, the second encoded data; and forming, by the image data combining unit, the encoded image, the encoded image comprising the first encoded data as a first tile or a first slice and the second encoded data as a second tile or a second slice.

* * * * *

UNITED STATES PATENT AND TRADEMARK OFFICE
CERTIFICATE OF CORRECTION

PATENT NO. : 10,972,659 B2
APPLICATION NO. : 16/546926
DATED : April 6, 2021
INVENTOR(S) : Ardö et al.

Page 1 of 1

It is certified that error appears in the above-identified patent and that said Letters Patent is hereby corrected as shown below:

In the Claims

In Claim 1, at Column 9, Line 65, after the word "device", delete "comprising" and insert therefor --comprising:--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*